June 10, 1952 L. W. BALLARD 2,600,185
PULSE RELAY CIRCUITS
Filed Aug. 12, 1950
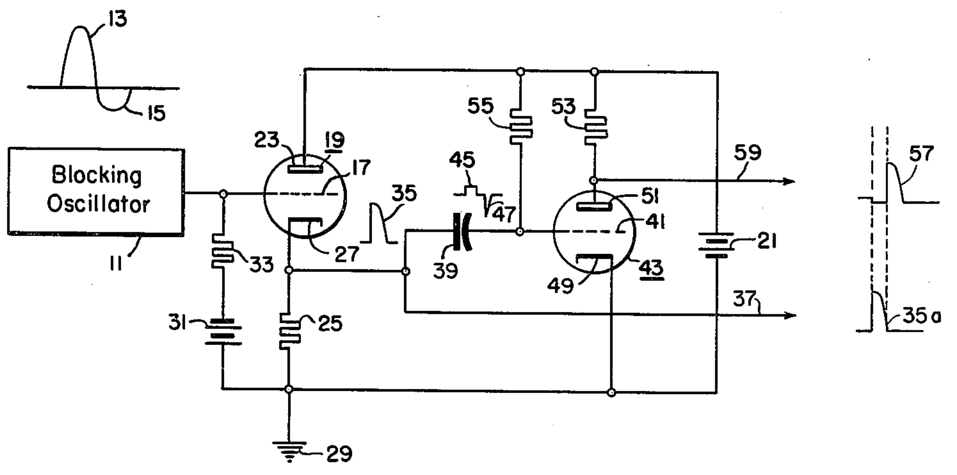
WITNESSES:
Edward Michaels
Wm. T. Wofford
INVENTOR
Lyttleton W. Ballard.
BY F. E. Browder
ATTORNEY Patented June 10, 1952

2,600,185

UNITED STATES PATENT OFFICE 2,600,185

PULSE DELAY CIRCUITS

Lyttleton W. Ballard, Ilchester, Md., assignor to Westinghouse Electric Corporation, East Pittsburgh, Pa., a corporation of Pennsylvania Application August 12, 1950, Serial No. 179,056

5 Claims. (Cl. 250—27)

My invention relates generally to pulse delay circuits, and particularly to an improved system for providing a delayed pulse which lags a reference pulse by a brief, fixed, interval of time. In automatic control of radar ranging units where it is necessary to automatically track a moving target, a system employing early and late gate pulses is conventionally employed. The early and late gates which constitute positive pulses separated by a brief, fixed, interval of time are fed to a time discriminating circuit which is capable of detecting the sense and magnitude of the time difference between the received echo from a target and early and late gates, respectively.

In such a system, it is customary to establish a correspondence between the times of occurrence of the early and late gates and the range indicated by the automatic tracking device and by use of the received echo to force the early and late gates to be moved so they occur in a definite time relationship with respect to the returned echo and in particular, so that they occur in a time relationship straddling the returned echo. A detailed description of one well known and commonly used system employing early and late gates in connection with radar tracking units may be found in the proceedings of the Institute of Radio Engineers for 1947, at pages 1046 and 1047. The system disclosed in the I. R. E. article for producing the early and late gates employs a blocking oscillator associated with a delay line. In such a system, the blocking oscillator pulse is utilized to produce the early gate, the pulse being concurrently applied to the delay line, and the pulse as it emerges from the remote end of the delay line forms the late gate.

The use of a delay line to produce the late gate pulse has been found undesirable because of the extreme tolerances required, and the resulting difficulty in manufacture and adjustment of the component parts.

It is, accordingly, an object of my invention to provide an improved system for generating a delayed pulse which lags a reference pulse by a brief, fixed, interval of time.

Another object of my invention is to provide a system for generating a pulse which lags a reference pulse by a fixed, brief, interval of time without utilizing delay lines.

It is a broad object of my invention to provide a system for generating early and late gates which shall require less space and weight and which shall be more economical to fabricate than systems having this purpose which are known in the prior art.

In accordance with my invention briefly described, I first generate a positive reference pulse. This reference pulse may be generated in a number of different ways, as by use of saturated triodes, thyratrons, pulse forming networks, etc. Preferably, I utilize a blocking oscillator to produce a damped sine wave of one cycle, and then pass this wave through a cathode follower circuit to eliminate the negative portion. I then apply the reference pulse to a differentiating circuit which comprises a suitable capacitor and the grid resistance of an electronic tube to which the capacitor is connected. The differentiating circuit produces sharp positive and negative pulses. The grid of the electronic tube is held saturated so that the positive pulse is dissipated. The negative pulse is inverted by the electronic tube and appears in the plate circuit as a sharp positive pulse, the leading edge of which corresponds in time to the trailing edge of the reference pulse. The reference pulse may be utilized as the early gate, and the derived pulse as the late gate in an automatic radar tracking system, by means well known in the art.

The advantages of the system of my invention reside in the derivation of a delayed or late gate pulse from a reference or early gate pulse without the use of a delay line, and with resulting simplicity in construction, adjustment and operation. The pulse formed is so shaped as to permit continual coincidence between both gates and the radar echo pulse, providing great sensitivity for detection of small motions of a radar target.

Other objects and advantages of my invention will appear from the following description taken in connection with the accompanying drawing, in which the single figure is a schematic diagram showing a preferred embodiment of my invention.

Referring now to the drawing, there is shown a blocking oscillator 11 which may be of any suitable design for producing a damped sine wave of one cycle comprising positive 13 and negative portions 15. The output of the blocking oscillator 11 is coupled to the grid 17 of a first electronic tube 19 which forms a portion of a cathode follower circuit. D. C. anode potential may be supplied to the cathode follower tube 19 from a suitable source, shown as a battery 21, having its positive terminal connected to the anode 23 and its negative terminal connected through a cathode resistor 25 to the cathode 27 and to ground at 29. Negative grid bias is supplied to the cathode follower tube 19 from a suitable source, shown as a battery 31, having its positive terminal connected to ground at 29 and its negative terminal connected through a resistance 33 to the grid 17 of the cathode follower tube 19. The output of the cathode follower, which is a clean positive pulse 35, is taken from the cathode resistor 25. This pulse 35 may be taken from the output lead 37 to form an early gate pulse 35*a*. This pulse 35 is also fed to a differentiating circuit which comprises a capacitor 39 and the resistance of the grid 41 of a second electronic tube 43. The capacitor 39 is connected between the cathode 27 of the first electronic tube 19 and the grid 41 of the second electronic tube 43. From the differentiating circuit there are derived sharp positive and negative pulses 45, 47, respectively. The cathode 49 of the second electronic tube 43 is connected to ground at 29, and its anode 51 is connected through a resistance 53 to the anode 23 of the first electronic tube 19. The grid 41 of the second electronic tube is held saturated by a resistor 55 connected between the grid 41 and the positive terminal of the anode supply 21. Consequently, the positive pulse 45 derived from the differentiating circuit is dissipated. The negative pulse 47 derived from the differentiating circuit appears in the anode circuit of the second eelctronic tube 43 as a sharp positive pulse 57, the leading edge of which corresponds in time to the trailing edge of the reference pulse 35. This pulse may be taken from a line 59 connected to the anode 51 of the second electronic tube 43 to form a late gate pulse 57.

The manner of application of the early and late gate pulses in conjunction with the echo pulse in a radar tracking system forms no part of the present invention, but is known per se, and accordingly description thereof is dispensed with herein.

While I have described my invention as utilizing a blocking oscillator and a cathode follower for generating the reference pulse, it will be realized that other means for producing a reference pulse having the requisite wave shape may be available and may be employed within the scope of my invention. Further variations and modifications of the invention may be resorted to without departing from the true scope of the invention as above described and defined in the appended claims.

I claim as my invention:

1. A gate generating system for generating early and late gate pulses comprising means for generating a damped sine wave of one cycle, a cathode follower circuit, a differentiating circuit, means for applying said sine wave to the input of said cathode follower circuit, means for taking a portion of said cathode follower output to form the early gate pulse, means for applying a portion of said cathode follower output to said differentiating circuit, means for clipping the positive pulse of said differentiating circuit output, and means for inverting the negative portion of said differentiating circuit output to form the late gate pulse.

2. In combination, a blocking oscillator, a cathode follower, an R–C differentiating circuit, a clipper, an inverter, means for triggering said oscillator, means for coupling said oscillator output to said cathode follower, means for taking a portion of said cathode follower output as an early gate pulse, means for coupling a portion of said cathode follower output to said differentiating circuit, means for coupling the output of said differentiating circuit to said clipper, means for coupling said clipper output to said inverter, and means for taking said inverter output as a late gate pulse.

3. In combination, an electronic tube having an anode, a cathode and a control electrode, a differentiating circuit comprising a capacitor coupled to said control element and the resistance of said control element, means for generating a reference pulse, means for coupling said reference pulse to said differentiating circuit, means for applying anode potential to said tube, means for holding said control element saturated, means for taking an output pulse from the anode circuit of said tube, said output pulse being positive and having a leading edge corresponding to the trailing edge of said reference pulse.

4. A gate generating system for generating early and late gate pulses, comprising means for generating a positive reference pulse having a substantially vertical leading edge, means for differentiating said reference pulse to obtain a positive and a negative pulse, means for dissipating said positive pulse, and means for inverting said negative pulse, said reference pulse constituting the early gate pulse and said inverted negative pulse constituting the late gate pulse, the leading edge of which corresponds in time to the trailing edge of said early gate pulse.

5. An electronic circuit for generating a late gate pulse having a substantially vertical leading edge which corresponds in time to the trailing edge of a reference pulse having a substantially vertical leading edge, said circuit comprising means for generating said reference pulse, an electronic tube having an anode, a cathode, and a control element, means for applying anode potential to said tube, means for holding the control element of said tube saturated, a capacitor connected to said control element, means for applying said reference pulse to said capacitor, and means for taking said late gate pulse from the anode circuit of said electronic tube.

LYTTLETON W. BALLARD.

REFERENCES CITED

The following references are of record in the file of this patent:

UNITED STATES PATENTS

| Number | Name | Date |
|---|---|---|
| 2,313,906 | Wendt | Mar. 16, 1943 |